United States Patent [19]
Smith

[11] 4,037,741
[45] July 26, 1977

[54] BALE TRANSPORTING AND FEEDING APPARATUS

[76] Inventor: Donald E. Smith, R.R. 3, Russell, Iowa 50238

[21] Appl. No.: 655,268

[22] Filed: Feb. 4, 1976

[51] Int. Cl.² ............................................. B66C 23/00
[52] U.S. Cl. ................ 214/130 C; 56/473.5; 56/480; 214/350; 214/DIG. 4
[58] Field of Search ............. 214/130 C, 144, DIG. 3, 214/DIG. 4, 350, 390, 372; 119/60; 56/473.5, 480, DIG. 9

[56] References Cited
U.S. PATENT DOCUMENTS

| | | | |
|---|---|---|---|
| 3,892,202 | 7/1975 | Feterl | 214/372 |
| 3,934,726 | 1/1976 | Martin | 214/130 C |
| 3,949,706 | 4/1976 | Coon, Jr. | 214/390 |
| 3,964,621 | 6/1976 | Youngkamp | 214/DIG. 4 |

*Primary Examiner*—Albert J. Makay
*Assistant Examiner*—Ross Weaver
*Attorney, Agent, or Firm*—John A. Beehner

[57] ABSTRACT

A bale loading, transporting and feeding apparatus of a type for handling large bales of hay. A two-wheeled trailer is provided with an elongated member having two or more shaft mechanisms rigidly attached thereto. The shaft mechanisms are perpendicularly disposed with respect to the elongated member and are non-parallel with respect to each other for facilitating the engaging of each bale while the previously engaged bale is lifted off of the ground. A feed rack is connected to the trailer and is selectively movable between a vertical loading and transporting position and a horizontal feeding position.

18 Claims, 15 Drawing Figures

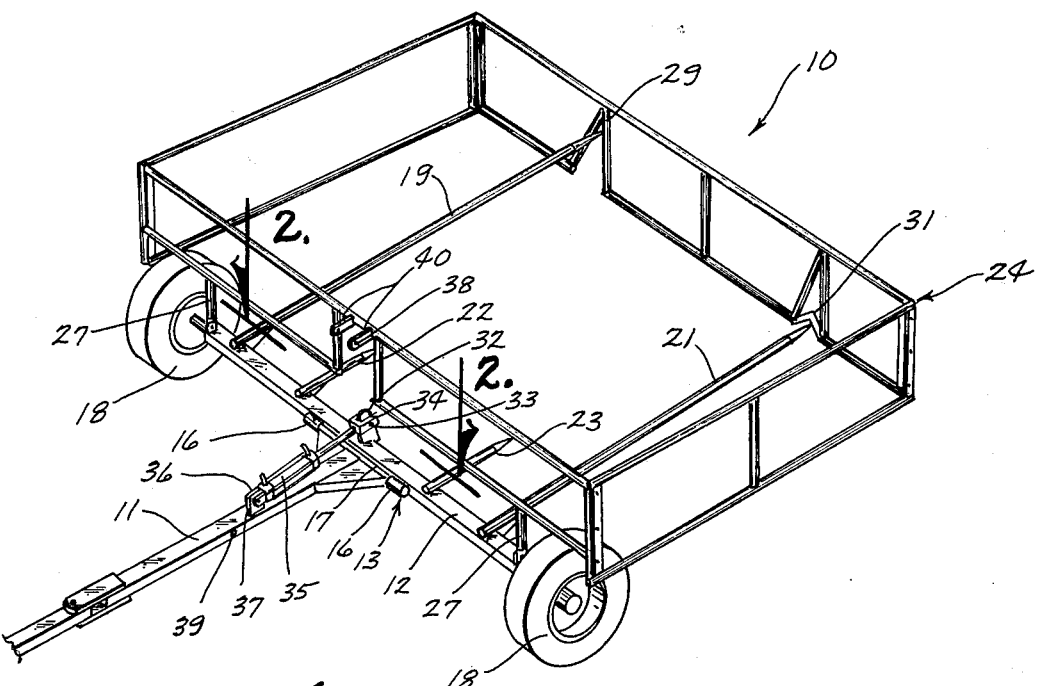
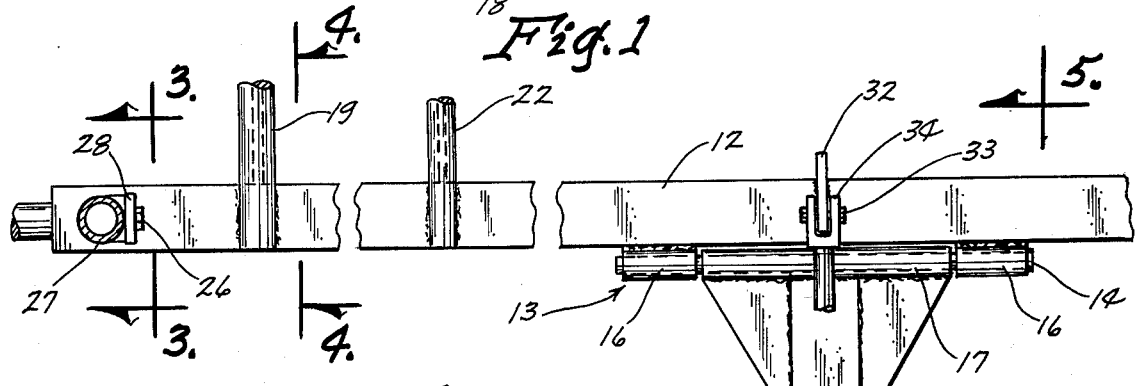
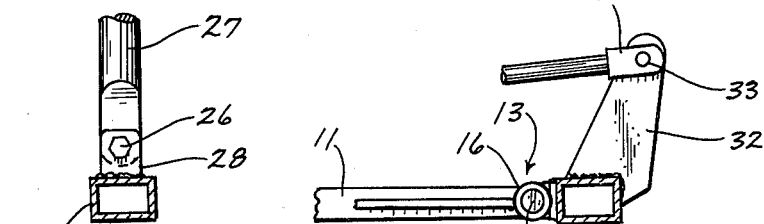
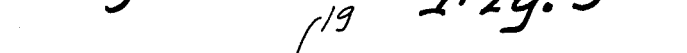
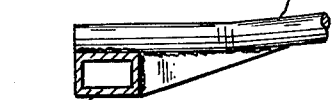

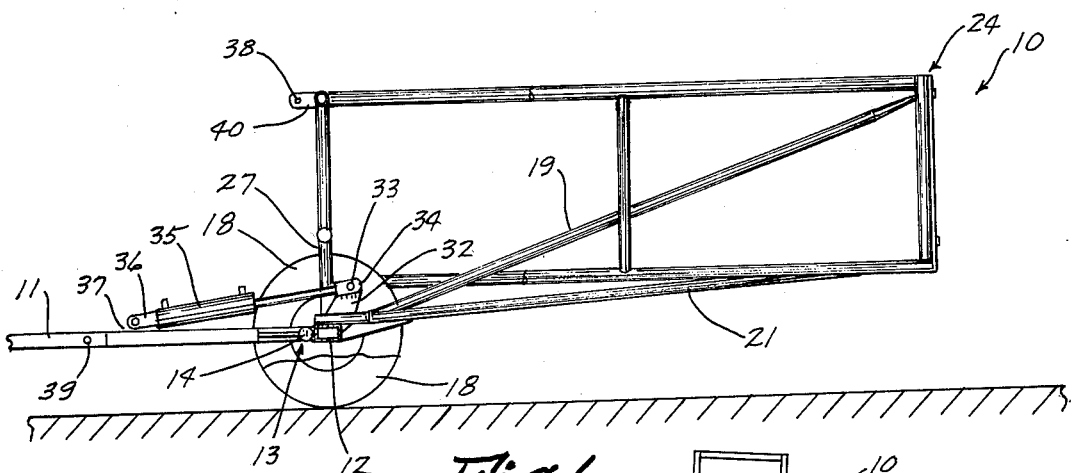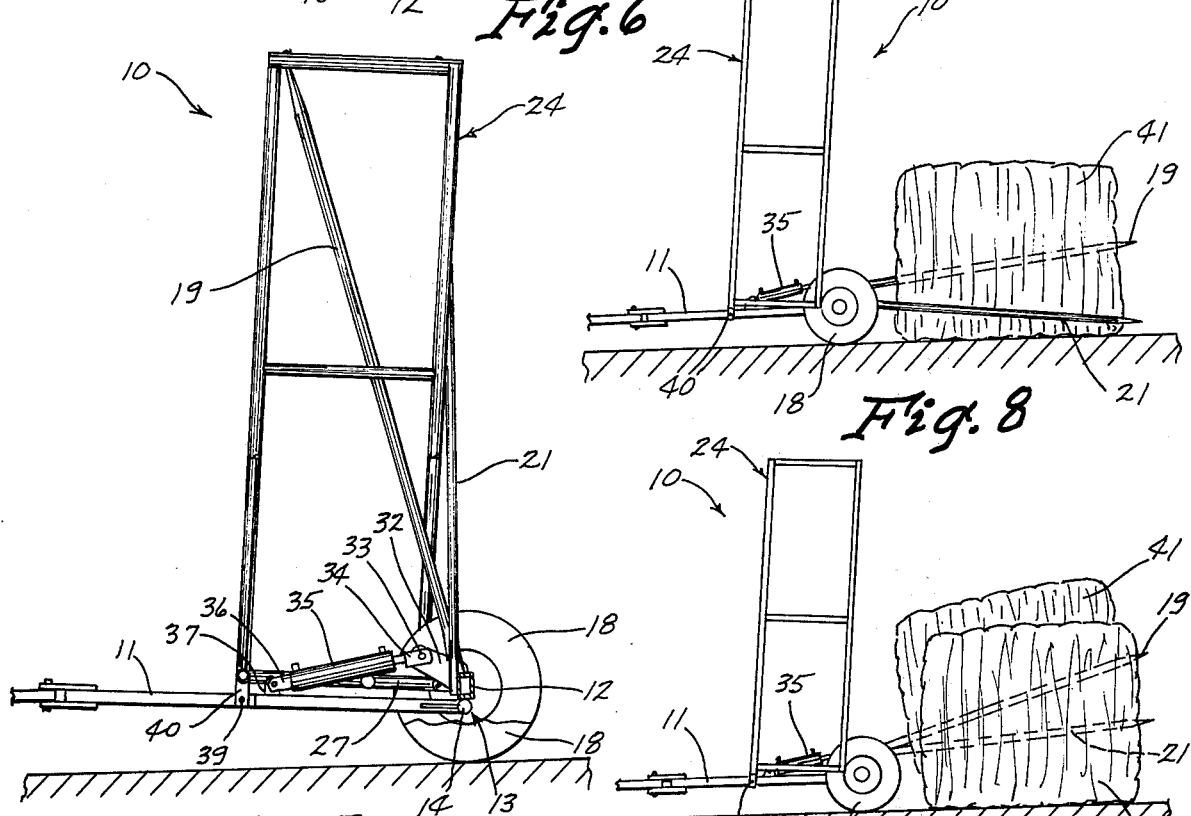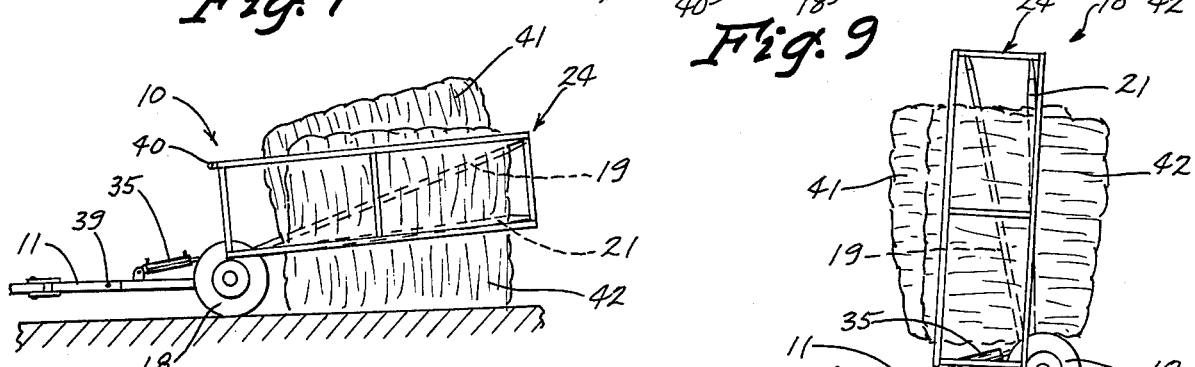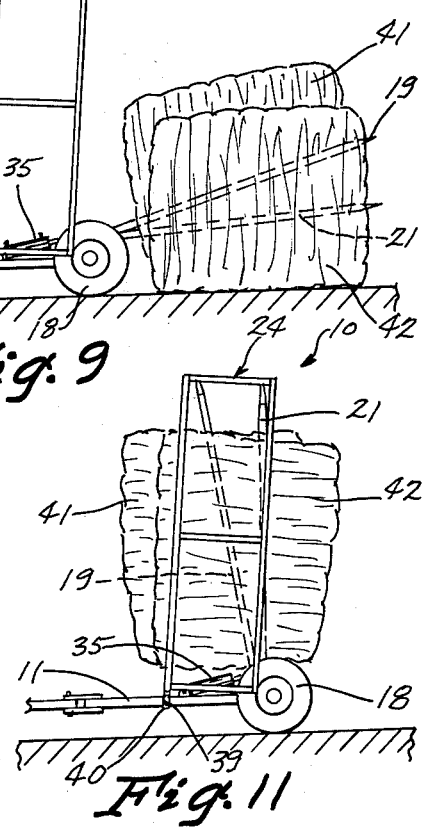

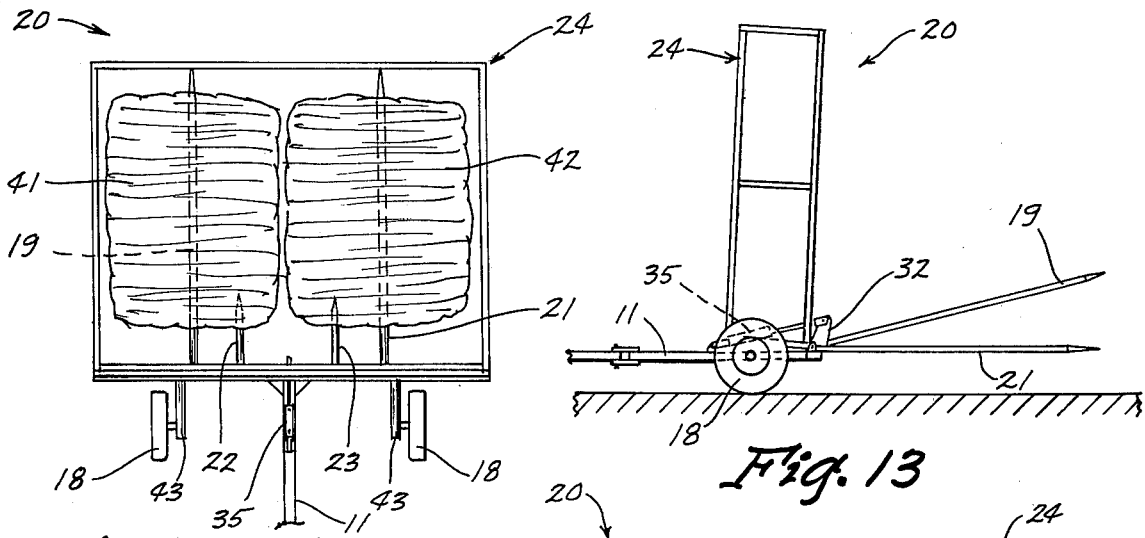
Fig. 12
Fig. 13
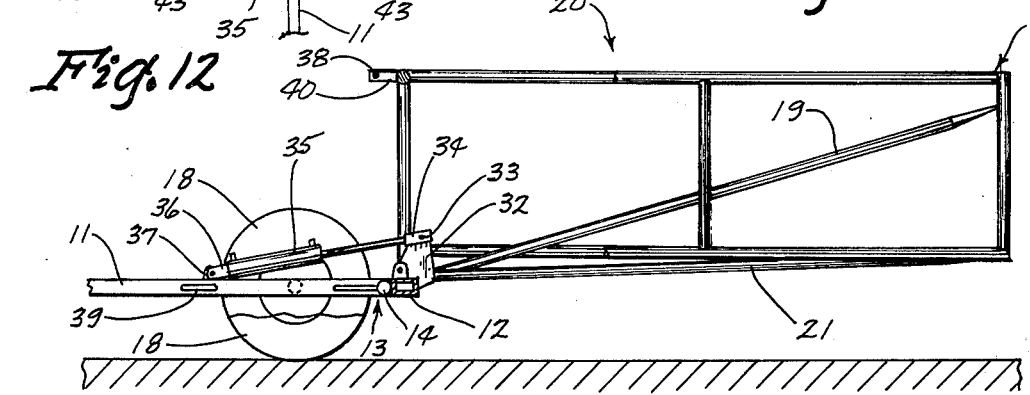
Fig. 14
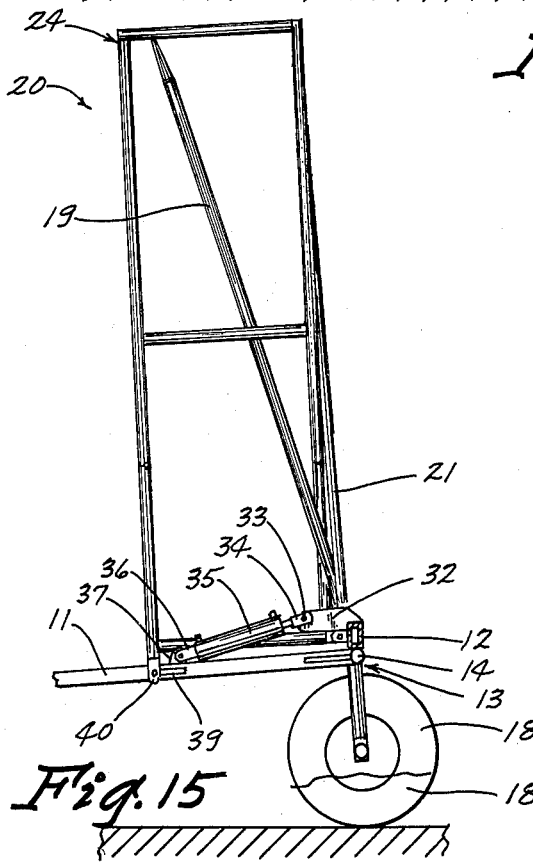
Fig. 15

BALE TRANSPORTING AND FEEDING APPARATUS

BACKGROUND OF THE INVENTION

With the advent of balers which produce large bales of hay weighing in excess of a half of a ton, there has become a genuine need for hay handling equipment which was not needed during an earlier era when only smaller manually maneuverable bales were the only type being produced. It is especially a problem to load and unload such large bales for transportation over long distances. It is, for example, too time consuming to transport one bale at a time, especially by use of a slow-moving agricultural tractor. Normally, however, only a large agricultural tractor is satisfactory for lifting, loading and unloading bales because of the large size and weight of the bales themselves. Consequently, there has been a need to have specially designed trailers for hauling such bales. There has also needed to be some other equipment available to load such trailers at the point of departure and unload the bales at the point of destination. Usually such loading and unloading is accomplished by a large tractor with a fork-lift structure attached to its three-point hitch, and it is therefore necessary to have such unloading equipment at the point of departure and at the point of destination.

There is consequently a need for a trailer having a self-contained mechanism for loading and unloading a plurality of large bales of hay. Some such trailers have been devised, but many of such trailers have the disadvantage of being too expensive because of the complexity thereof. Such trailers also have the disadvantage that they are also expensive to maintain; and, because of the many moving parts thereon, there is an increased danger of breakdowns and a corresponding doubt about their dependability. At least one design of such trailer uses a chain conveyor structure to move each bale to its proper place on the trailer. It has been found, however, that such chain conveyor devices tend to tear up the bales somewhat. This is especially true with respect to large round bales having twine thereon which has rotted through due to long periods of storage. When such an exteriorly deteriorated bale is transported by a chain conveyor type of loading device, the outer weathered layer tends to be torn off and is lost. If the bale is then stored outside where it is subject to rain and snow, as is usually the case, then even more of the outer layer of the bale will become weathered and therefore be of less food value to livestock than if the original outermost layer had been retained.

When these large bales of hay are fed to livestock such as cattle, there is a tendency for such livestock to step on certain parts of the bale while eating other parts of it. Consequently, much of the hay is trampled into the ground and therefore becomes unsuitable for feed and is wasted. Accordingly, various types of feeders have been devised to be placed around such a bale once the bale is transported to the place where it is to be fed to livestock.

Because of the large size of the aforementioned modern bales, it is not practical or feasible, in most cases, to actually place the bale into a feed bunk or rack, but instead the rack is placed around it as mentioned above. Accordingly, it can be appreciated that several pieces of equipment have heretofore been necessary in order to effectively transport and feed such large bales of hay to livestock. There is therefore a need to simplify these operations as much as possible.

SUMMARY OF THE INVENTION

The present invention relates to a hay loading, transporting and feeding device of a type suitable for handling large round bales of hay. A trailer adapted to be connected to a prime mover is provided with shaft mechanism for insertion into bales of hay by backing the trailer and shaft mechanism into such bales. These shaft mechanisms are then selectively rotatable to thereby lift such bales off of the ground and onto the top of the trailer for transportation to the place of feeding of such bales to livestock. More than one such shaft mechanism is preferably provided so that more than one bale can be loaded, transported and fed. Each shaft mechanism is rigidly connected to and rotatable about an elongated member attached to the frame and each shaft mechanism is non-parallel with respect to other shaft mechanisms so that each succeeding bale can be engaged while the previously loaded bale is held off of the ground.

A feed rack structure is also disposed on the trailer and is movable from a position whereby it does not interfere with the loading operation to a horizontal position whereby it surrounds the shaft means and any bales attached thereto for the purpose of allowing livestock to feed on such bales, but to prevent such livestock from stepping on such bales while feeding, and thereby preventing hay from being wasted.

An object of the present invention is to provide a single device for loading, transporting and feeding bales of hay.

Another object of the invention is to provide a rack for a feeding trailer which is movable with respect to such trailer for facilitating the loading of such trailer.

A further object of the invention is to provide a bale loading device capable of loading a plurality of bales thereon with the use of a single hydraulic cylinder.

Still another object of the present invention is to provide a bale loading and transporting device for placing bales to be transported directly over the axle of such device.

Other objects, advantages and novel features of the present invention will become apparent from the following detailed description when taken in conjunction with the accompanying drawings.

BRIEF DESCRIPTION OF THE DRAWINGS

FIG. 1 is a perspective view of the bale loading, transporting and feeding device of the present invention;

FIG. 2 is a top partial cross-sectional view taken along line 2—2 of FIG. 1;

FIG. 3 is a partial cross-sectional view taken along line 3—3 of FIG. 2;

FIG. 4 is a partial cross-sectional view taken along line 4—4 of FIG. 2;

FIG. 5 is a partial cross-sectional view taken along line 5—5 of FIG. 2;

FIG. 6 is a side elevational view with a front portion thereof broken away for clarity;

FIG. 7 is a side elevational view similar to FIG. 6 and having a portion thereof broken away, but showing present invention in a transport position;

FIG. 8 is a side elevational view showing the device in engagement with a first bale;

FIG. 9 is a side elevational view like FIG. 8, but showing how a second bale is engaged by the invention;

FIG. 10 is a side elevational view showing a rack in a feeding position;

FIG. 11 is a side elevational view similar to FIG. 7, but showing two bales loaded thereon for transporting to a feeding site;

FIG. 12 is a plan view of another embodiment of the present invention;

FIG. 13 is a side elevational view of the embodiment of FIG. 12 showing the device in position to engage a first bale;

FIG. 14 is a side elevational view, like FIG. 13, but showing the rack down in a feeding position; and FIG. 15 is a side elevational view similar to FIGS. 13 and 14 but showing the device in a transport position.

DESCRIPTION OF THE PREFERRED EMBODIMENT

Referring now to the drawings wherein like reference numerals designate identical or corresponding parts throughout the several views, FIG. 1 shows a bale loading, transporting and feeding device 10 constructed in accordance with the present invention.

A conventional tongue member 11 is shown pivotally attached to an elongated member 12 by means of a hinge arrangement 13, including a pin 14 which is received through loop members 16 which are, in turn, rigidly attached to the elongated member 12 and through a cylindrical member 17. The cylindrical member 17 is rigidly attached to the tongue member 11. Additionally, wheels 18 are rotatably attached to each end of the elongated member 12 for the purpose of allowing the invention 10 to be towed from place to place by a prime mover attached to the tongue member 11.

A first shaft 19 and a second shaft 21 are rigidly attached to the elongated member 12 such as by welding. The shafts 19 and 21 are each disposed perpendicularly with respect to the elongated member 12 and are offset about 15° with respect to each other. Additionally, two rod members 22 and 23 are rigidly attached to the elongated member 12. A feed rack 24 is pivotally attached to the elongated member 12 by a hinge structure including pins 26 which extend through downwardly extending portions 27 on the rack 24, and through upstanding brackets 28 which are welded to the elongated member 12. It can be seen by reference to FIGS. 6 and 7, for example, that the rack 24 is pivotally movable from a substantially horizontal position as shown in FIG. 6 to a substantially vertical position as shown in FIG. 7.

A first V-shaped abutment structure 29 is built into the feed rack 24 for reception of a pointed end of the first shaft 19 for the purpose of holding the shaft in the position shown in FIGS. 1 and 6, or for allowing movement of the first shaft 19 to tend to move the rack 24 to the vertical position shown in FIG. 7. It is noted, however, that the abutment structure 29 is carefully designed so that the point of the shaft 19 does not extend beyond the rack 24, thereby eliminating a possible safety hazard to animals feeding through the rack 24. A second abutment structure 31 is built into the feed rack 24 for the purpose of receiving the pointed end of the second shaft 21 for the same purpose that the abutment structure 29 receives the first shaft 19 as explained above.

A central plate member 32 is also rigidly attached to the elongated member 12, and this plate member 32 has an opening in the top end thereof for reception of a pin 33. This pin 33 attaches a clevis portion 34 of a hydraulic cylinder 35 thereto. The other end of the hydraulic cylinder 35 is pivotally attached to the tongue 11 by a pin 36 extending through upstanding members 37, which are rigidly attached to the tongue member 11. This hydraulic cylinder 35 is preferably of a double-acting type and is connected through a source of hydraulic oil and through controls (not shown) which are preferably located on the towing vehicle and within easy access to the driver thereof.

It is noted that the hydraulic cylinder 35 is operable to rotate or pivot the elongated member 12, for the purpose of controlling the position of the shafts 19 and 21 and the rods 22 and 23. In the extended position of the hydraulic cylinder 35, it is noted that the shafts 19 and 21 will be in the approximate position as is shown in FIG. 8. When it is desired to move the rack 24 from the position shown in FIGS. 1 and 6 to the position shown in FIG. 7, the hydraulic cylinder is shortened in effective length and the shafts 19 and 21 act on the abutments 29 and 31 of the rack 24 to lift the rack 24 to the vertical position shown in FIG. 7. At such time, a pin 38 can be placed through the opening 39 in the tongue member 11 and through the openings in the members 40 on the front and center of the rack 24. This serves as a locking device for holding the rack 24 in the position shown in FIG. 7 for transporting from place to place or during the loading of bales.

In operation, the device 10 of the present invention would be oriented in a manner as shown in FIG. 8, whereby the rack 24 would be in the vertical position and the hydraulic cylinder 35 would be extended so that the first shaft 19 extended substantially horizontally and a second shaft 21 extended downwardly somewhat. Once this had been done, then the towing vehicle is used to back the shaft 19 into the bale 41 as is shown in FIG. 8. Once this has been done, then the hydraulic cylinder is shortened slightly in effective length to a point in which the second shaft 21 would be substantially horizontal for example as shown in FIG. 9. At such time the device 10 could then be backed up adjacent to a second bale 42 and then backed into such bale 42 as has been shown in FIG. 9. Once this has been done, then the effective length of the hydraulic cylinder 35 can be further shortened so as to move the bales to the position as shown in FIG. 11, whereby they can be transported from place to place and to the point of destination where they can be fed to livestock.

Once such bales have been transported to the place where they are to be fed to livestock, the pin 38 is removed from the tongue member 11 and from the members 40 of the rack 24 so that the rack is then free to pivot into the horizontal position. Then the hydraulic cylinder 35 is activated to extend its effective length and thereby rotate the bales from the position as shown in FIG. 11 to the position as shown in FIG. 10. If portions of the bale are in contact with the rack 24, it, too, will be moved down to the position shown in FIG. 10, but otherwise such rack can be manually moved very easily from the vertical position to the horizontal feeding position shown in FIG. 10. Then the towing vehicle can be disconnected from the tongue member 11 and the livestock, such as cattle, are free to place their heads through the openings in the rack 24 and thereby feed on the bales 41 and 42. It is well known that cattle or other livestock will tend to trample and waste hay being fed to them unless they are restrained from doing so. Accordingly, the rack 24 prevents such livestock from stepping on portions of the bales 41 and 42, but yet allows them to easily feed on such bales while the bales are attached to the shafts 19 and 21, or even after so much has been eaten that the remainder of the bales 41 and 42 are not attached to the shafts 19 and 21. Once these bales 41 and 42 have been completely consumed by livestock, then the towing vehicle would again be attached thereto and the above outlined procedure would be performed again to provide more bales for the livestock.

It is noted that when there are no bales on the device, and it is to be towed on roads or highways, that the rack 24 would be locked to the tongue member 11 and the first and second shaft 19 and 21, respectively, would be moved to the somewhat vertical position shown in FIG. 7. It is also noted that the rod 22 is substantially parallel and adjacent to the first shaft 19 whereby when a bale is engaged by the shaft 19, that such bale is also engaged by the rod 22 for the purpose of preventing the bale 41 from rotating and thereby possibly causing such bale to fall apart. The rod 23 is parallel to and adjacent the second shaft 21 and is for the same purpose with respect to the shaft 21 and bale 42 as the rod 22 is to the first shaft 19 and the first bale 41.

Referring now to FIGS. 12-15, it can be seen that a second embodiment 20 is shown. It is noted that the second embodiment 20 is virtually identical to the first embodiment 10 except for the fact that levers 43 are rigidly attached to the ends of the elongated member 12 for rotatably attaching the wheels 18 thereto. The advantage of such a modification is to allow te device 20 to be low to the ground during such times when it is to be in a bale engaging position, but causes the entire device to be raised upwardly by approximately the length of the levers 43 in the transport position as shown in FIG. 15. Otherwise, the operation of the second embodiment 20 is identical to that described with respect to the embodiment 10 and all of the other portions of the embodiment 20 of FIGS. 12-15 are virtually identical and accordingly have identical numerals thereon.

Accordingly, it can be seen that the present invention as illustrated by the above two embodiments does indeed accomplish all of the objects mentioned above. Obviously, many modifications and variations of the present invention are possible in light of the above teachings. It is therefore to be understood that, within the scope of the appended claims, the invention may be practiced otherwise than as specifically described.

I claim:

1. Hay handling apparatus comprising:
   a frame adapted to be connected to prime mover;
   wheel means rotatably attached to said frame along a substantially horizontal axis for allowing said apparatus to be towed from place to place;
   an elongated member pivotally attached to the frame along a substantially horizontal axis;
   a first shaft means rigidly attached to said elongated member;
   a second shaft means rigidly attached to said elongated member, said first and second shaft means being substantially perpendicular with respect to the pivotal axis of the elongated member but nonparallel with respect to each other; and
   means for pivoting said elongated member and thereby said first and second shaft means with respect to said frame.

2. Hay handling apparatus as defined in claim 1 further comprising:
   a first rod rigidly attached to said elongated member, said rod being spaced from but adjacent to said first shaft means and being substantially parallel to said first shaft means for preventing a bale loaded on said first shaft means from rotating during transit; and
   a second rod rigidly attached to said elongated member, said rod being spaced from but adjacent to said second shaft means, and being substantially parallel to said second shaft means for preventing a bale loaded on said second shaft means from rotating during transit.

3. Hay handling apparatus as defined in claim 1 including a rack means attached to said frame for movement between a first position allowing said first and second shaft means to engage bales of hay and a second position substantially surround said first and second shaft means for feeding hay attached to the first and second shaft means.

4. Hay handling apparatus as defined in claim 1 including rack means pivotally attached to said frame and movable between a first vertical position and a second horizontal position, whereby in the vertical position of the rack means hay can be loaded on the first and second shaft means and transported from place to place; and, in the second position of said rack means, the rack means surrounds the hay attached to the first and second shaft means.

5. Hay handling apparatus as defined in claim 4 wherein the frame includes a tongue member for attachment to a prime mover; locking means attached to one of said rack means and said tongue member for selectively locking the rack means to the tongue member for holding the rack means in said first position.

6. Hay handling apparatus as defined in claim 4 wherein said rack means includes a first abutment means on one end thereof, said first shaft means having a free end thereof for engagement with said first abutment means for selectively lifting said rack means from the horizontal position to the vertical position.

7. Hay handling apparatus as defined in claim 6 wherein said rack means further includes a second abutment means on said one end thereof, said second shaft means having a free end thereof for engagement with said second abutment means for selectively aiding in the lifting of said rack means from the horizontal position thereof to the vertical position thereof.

8. Hay handling apparatus as defined in claim 6 wherein said pivoting means includes a hydraulic cylinder.

9. Hay handling apparatus comprising:
   a frame adapted to be connected to a prime mover;
   an elongated member pivotally attached to the frame along a substantially horizontal axis;
   lever means rigidly connected at one end thereof to said elongated member;
   wheel means rotatably attached to the other end of said level means along a substantially horizontal axis for allowing said apparatus to be towed from place to place;
   a first shaft means rigidly attached to said elongated member;
   a second shaft means rigidly attached to said elongated member, said first and second shaft means being substantially perpendicular with respect to the pivotal axis of the elongated member but nonparallel with respect to each other; and means connected to said frame and to said elongated member for selectively pivoting said elongated member and thereby said first and second shaft means with respect to the frame.

10. Hay handling apparatus as defined in claim 9 further comprising:
   a first rod rigidly attached to said elongated member, said rod being spaced from but adjacent to said first shaft means and being substantially parallel to said first shaft means for preventing a bale loaded on said first shaft means from rotating during transit; and
   a second rod rigidly attached to said elongated member, said rod being spaced from but adjacent to said second shaft means, and being substantially parallel to said second shaft means for preventing a bale loaded on said second shaft means from rotating during transit.

11. Hay handling apparatus as defined in claim 9 including rack means pivotally attached to said frame and movable between a first vertical position and a second horizontal position, whereby in the vertical position of the rack means hay can be loaded on the first and second shaft means and transported from place to place; and, in the second position of said rack means, the rack means surrounds the hay attached to the first and second shaft means.

12. Hay handling apparatus as defined in claim 11 wherein said rack means includes a first abutment means on one end thereof, said first shaft means having a free end thereof for engagement with said first abutment means for selectively lifting said rack means from the horizontal position to the vertical position.

13. Hay handling apparatus as defined in claim 12 wherein said rack means further includes a second abutment means on said one end thereof, said second shaft means having a free end thereof for engagement with said second abutment means for selectively aiding in the lifting of said rack means from the horizontal position thereof to the vertical position thereof.

14. Hay handling apparatus as defined in claim 13 wherein the frame includes a tongue member for attachment to a prime mover; locking means attached to one of said rack means and said tongue member for selectively locking the rack means to the tongue member for holding the rack means in said first position.

15. Hay handling apparatus as defined in claim 14 wherein said pivoting means includes a hydraulic cylinder.

16. Apparatus for handling at least two bales of hay comprising:
   a. a frame;
   b. a first shaft means for impaling a first bale;
   c. means for supporting said first shaft means on said frame for pivotal movement about a horizontal axis between a first substantially horizontal position and a second substantially vertical position;
   d. a second shaft means for impaling a second bale;
   e. means for supporting said second shaft means on said frame for pivotal movement about said horizontal axis between a first substantially horizontal position and a second substantially vertical position;
   f. said first and second shaft means perpendicular to and angularly spaced about said horizontal axis in fixed relative positions;
   g. means for pivoting said first and second shaft means in unison from the respective first positions therefor to the respective second positions therefor whereby first and second bales impaled in succession by the first and second shaft means respectively in the first positions therefor, are movable from respective positions on the ground to respective positions above said frame.

17. Hay handling apparatus comprising:
   a. a frame,
   b. shaft means operatively connected at one end thereof to said frame for engaging a bale therearound;
   c. means for pivotally attaching the shaft means to said frame;
   d. means for pivoting said shaft means between a first substantially horizontal position and a second substantially vertical position, whereby a bale attached to said shaft means is movable between a position on the ground and a position above said frame;
   e. a second shaft means operatively connected to said frame and rigidly attached with respect to the first said shaft means, said second shaft means being substantially non-parallel with respect to the first said shaft means; and
   f. said frame including an elongated frame member, the first said shaft means and the second shaft means rigidly connected to said elongated frame member, said elongated frame member pivotally disposed with respect to the frame along a horizontal axis, and the first said shaft means and the second shaft means being substantially perpendicular to said elongated frame member.

18. Hay handling apparatus comprising:
   a. a frame;
   b. shaft means operatively connected at one end thereof to said frame for engaging a bale therearound;
   c. means for pivotally attaching the shaft means to said frame;
   d. means for pivoting said shaft means between a first substantially horizontal position and a second substantially vertical position, whereby a bale attached to said shaft means is movable between a position on the ground and a position above said frame; and
   e. rack means pivotally attached to said frame and movable between a first vertical position and a second horizontal position, whereby in the vertical position of the rack means hay can be loaded on the shaft means and transported from place to place; and, in the second position of said rack means, the rack means surrounds the hay attached to the shaft means.

* * * * *